US007085737B2

(12) United States Patent
Dan et al.

(10) Patent No.: US 7,085,737 B2
(45) Date of Patent: Aug. 1, 2006

(54) METHOD AND APPARATUS FOR META-SHOPPING AND DYNAMIC SETUP OF B2B ECOMMERCE

(75) Inventors: Asit Dan, Pleasantville, NY (US); Daniel Manuel Dias, Mohegan Lake, NY (US); Thao N. Nguyen, Katonah, NY (US); John F. Schumacher, White Plains, NY (US); Hidayatullah H. Shaikh, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 09/815,374

(22) Filed: Mar. 22, 2001

(65) Prior Publication Data

US 2002/0138370 A1    Sep. 26, 2002

(51) Int. Cl.
G06F 17/30    (2006.01)
(52) U.S. Cl. .......................................... 705/27; 705/26
(58) Field of Classification Search .................. 705/26, 705/27
See application file for complete search history.

(56) References Cited

U.S. PATENT DOCUMENTS 5,970,475 A * 10/1999 Barnes et al. .................. 705/27

6,633,852 B1 * 10/2003 Heckerman et al. .......... 705/27
6,850,900 B1 * 2/2005 Hare et al. ..................... 705/26

FOREIGN PATENT DOCUMENTS

JP    2000113056    *  3/2000

OTHER PUBLICATIONS

Murphy, Diane, "The exciting role of the credit manager in the expanding e-commerce market place", Business Credit, Oct. 2000, 15 pages.*

* cited by examiner

Primary Examiner—Mark Fadok
(74) Attorney, Agent, or Firm—Duke W. Yee; Alison D. Mortinger; Wayne P. Bailey

(57) ABSTRACT

A method, apparatus, and computer implemented instructions for generating a customized catalog for an entity or organization. Items from a base catalog are presented to a user located at a remote data processing system. One or more items are selected by a user through a process of "meta-shopping". The selected items are placed in a set, also referred to as a "meta-shopping cart", used to generate the customized catalog. Terms for purchasing items in the customized catalog are associated with the customized catalog. Further, a protocol for purchasing items from the customized catalog may be established, and the customized catalog is then placed on a Web site.

8 Claims, 4 Drawing Sheets

US 7,085,737 B2

METHOD AND APPARATUS FOR META-SHOPPING AND DYNAMIC SETUP OF B2B ECOMMERCE

BACKGROUND OF THE INVENTION

1. Technical Field

The present invention provides an improved data processing system, in particular a method and apparatus for setting up a customized catalog. Still more particularly, the present invention provides a method, apparatus, and computer implemented instructions for setting up a customized catalog for use in a business-to-business relationship.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies, which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transactions using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The LRL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and businesses use the Web to purchase various goods and services. In offering goods and services, some companies offer goods and services solely on the Web while others use the Web to extend their reach.

With respect to these commercial activities and others, businesses and other content providers go through a highly manual process to set up mechanisms to facilitate business-to-business commerce. For example, in setting up customized catalogs for use between businesses, the items in the catalog are currently set up through telephonic communications. A customized catalog is also referred to as a "catalog". Manual configuration of the catalog as well as various terms and operating conditions also are discussed telephonically. After agreement is reached, then the catalog is configured and placed on a Web site. Other times, the catalog may be set up through face-to-face meetings between representatives of the different businesses. Such a mechanism takes time and manpower.

Therefore, it would be advantageous to have an improved method and apparatus for setting up a business-to-business commerce relationship.

SUMMARY OF THE INVENTION

The present invention provides a method, apparatus, and computer implemented instructions for generating a customized catalog for an entity or organization. Items from a base catalog are presented to a user located at a remote data processing system. One or more items are selected by a user through a process of "meta-shopping". The selected items are placed in a set, also referred to as a "meta-shopping cart", used to generate the customized catalog. Terms for purchasing items in the customized catalog are associated with the customized catalog. Further, a protocol for purchasing items from the customized catalog may be established, and the customized catalog is then placed on a Web site.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
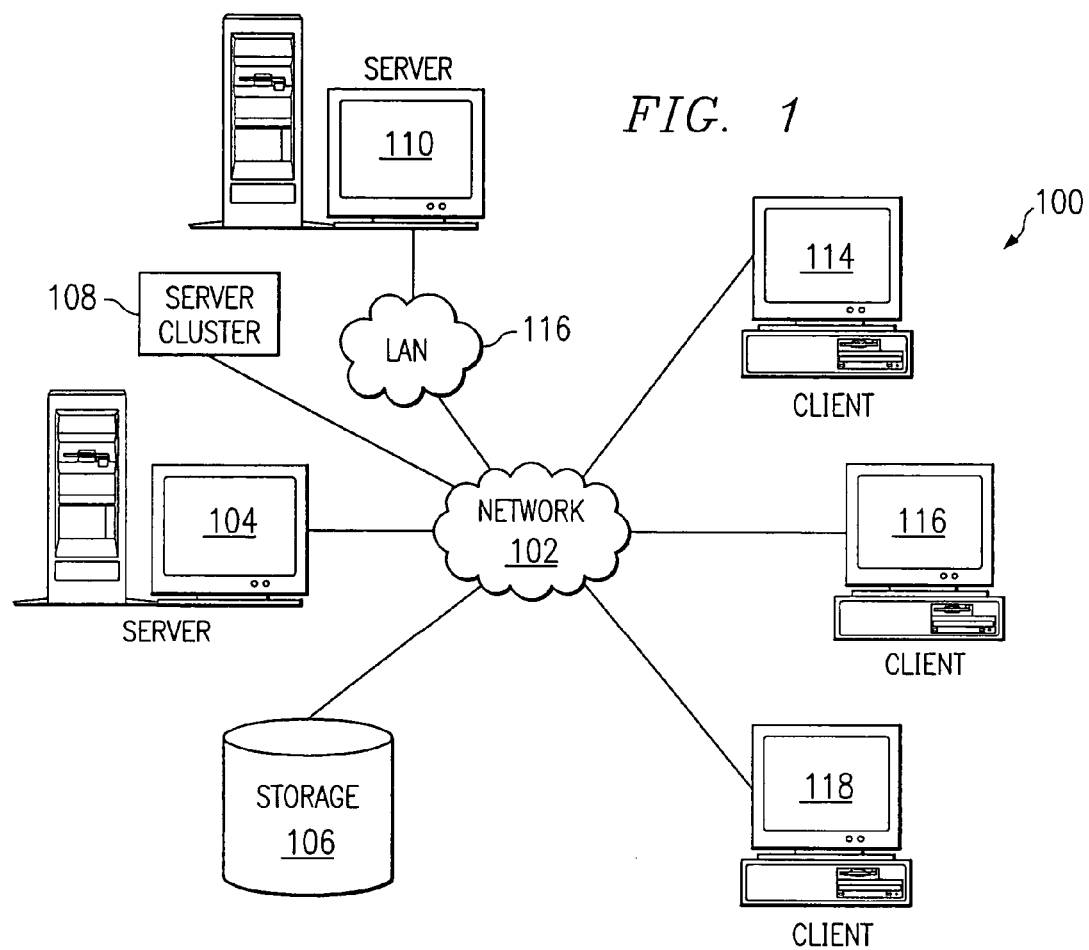
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. Further, network data processing system 100 also includes server cluster 108 as well as a server 110. In this example, server 110 is connected to network 102 through local area network (LAN) 112. In addition, clients 114, 116, and 118 also are connected to network 102. These clients 114, 116, and 118 maybe, for example, personal computers or network computers. In the depicted example, server 104, server cluster 108, and server 110 provide a distributed web commerce server system for processing requests from clients 114–118. In the depicted examples, server 104, server cluster 108 and server 110 may be located in multiple, geographically distributed sites. The servers are presented to users, such as those at clients 114–118, as a single website. Additionally, one of the server, such as server 104 may act as a load balancer to receive and direct requests from the clients to the appropriate servers within the system. Network data processing system 100 may include additional servers, clients, and other devices not shown.

In the depicted examples, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN).

FIG. 1 is intended as an example, and not as an architectural limitation for the present invention.

Figure 2:
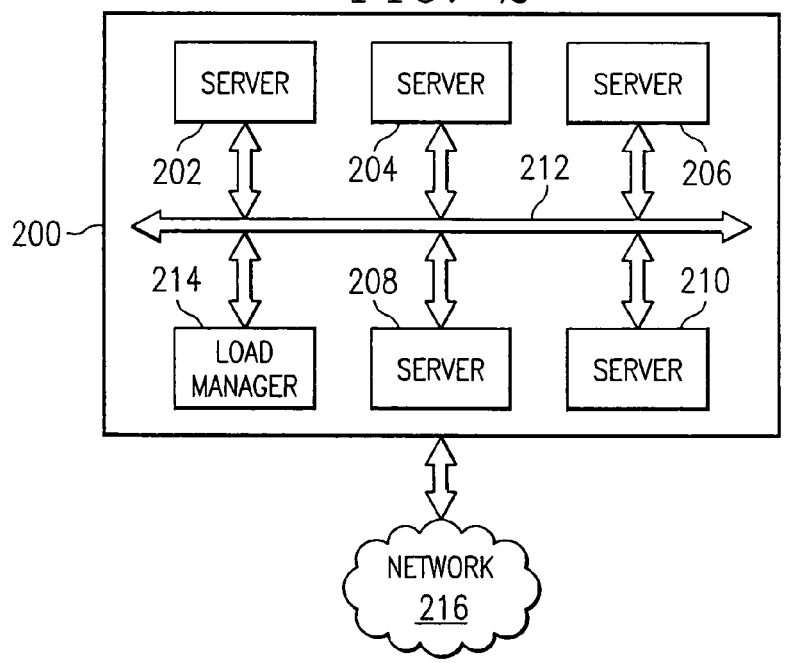
FIG. 2 is a block diagram of a server cluster in accordance with a preferred embodiment of the present invention.

With reference now to FIG. 2, a block diagram of a server cluster is depicted in accordance with a preferred embodiment of the present invention. Server cluster 200 in this example may be implemented as server cluster 108 in FIG. 1.

In this example, servers 202–210 are in communication with each other through communications system 212, which may take various forms. Communications system 212 may be, for example, a bus, a network, or a shared memory. Communications system 212 is used to handle routing of requests and responses directed towards server farm 200.

Load manager 214 also is connected to communications system 212 and serves to receive requests directed to server farm 200 from network 216. Load manager 214 also serves to distribute requests to servers 202–210 for processing.

Figure 3:
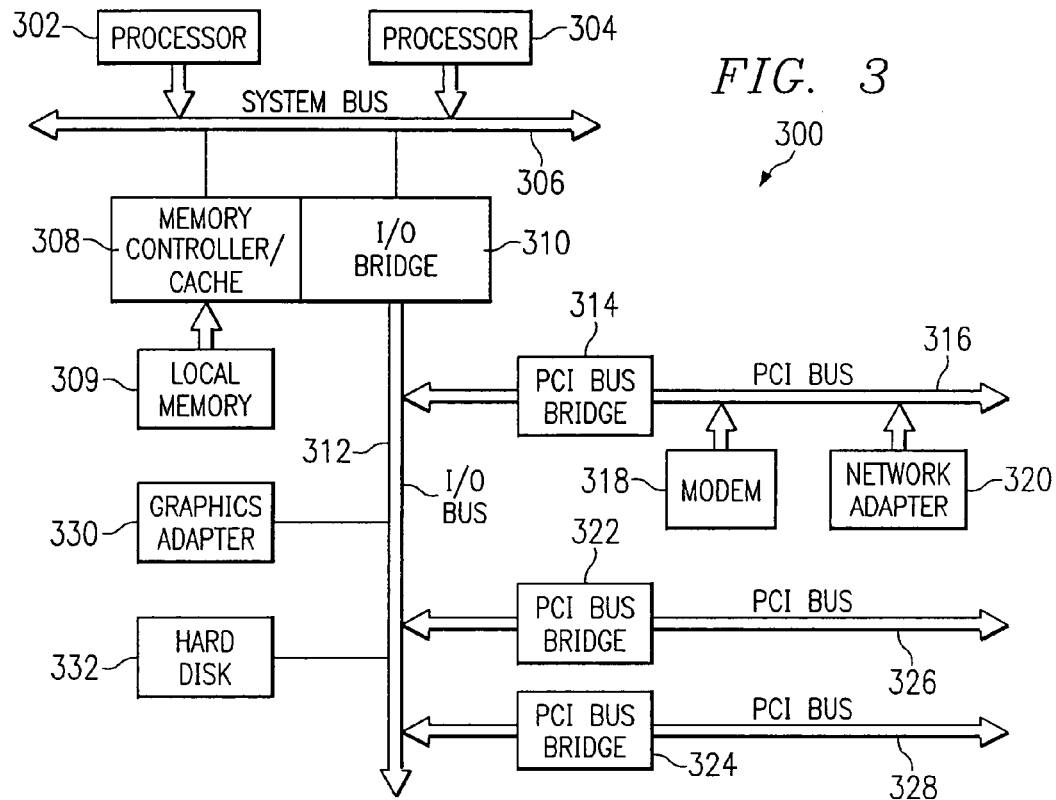
FIG. 3 is a block diagram of a data processing system that may be implemented as a server in accordance with a preferred embodiment of the present invention.

Referring to FIG. 3, a block diagram of a data processing system that may be implemented as a server, such as server 104 in FIG. 1, is depicted in accordance with a preferred embodiment of the present invention. Further, data processing system 300 may be implemented as a server, such as server 202 with server cluster 200, in FIG. 2.

Data processing system 300 may be a symmetric multi-processor (SMP) system including a plurality of processors 302 and 304 connected to system bus 306.

Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI bus 316. Typical PCI bus implementations will support four PCI expansion slots or add-in connectors. Communications links to network computers 114–118 in FIG. 1 may be provided through modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM RISC/System 6000 system, a product of International Business Machines Corporation in Armonk, N.Y., running the Advanced Interactive Executive (AIX) operating system.

Figure 4:
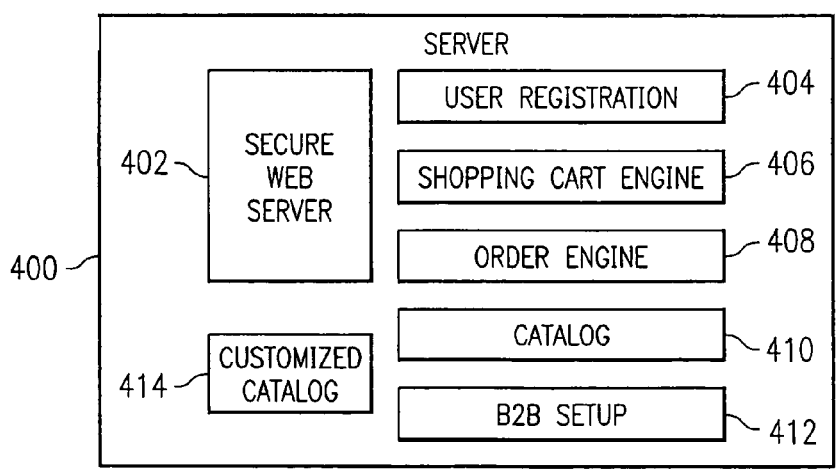
FIG. 4 is a diagram illustrating components used in a web commerce server in accordance with a preferred embodiment of the present invention.

Turning next to FIG. 4, a diagram illustrating components used in a web commerce server is depicted in accordance with a preferred embodiment of the present invention. In this example, server 400 hosts web commerce system processes, which may be accessed across the Internet. In particular, these processes are used to facilitate electronic commerce or e-commerce. E-commerce involves doing business online, typically via the Web. E-commerce also is called "e-business," "e-tailing" and "I-commerce."

As illustrated, server 400 includes a secure web server 402, which is used to receive and process requests for information and purchase orders. In this example, secure web server 402 uses various known encryption techniques to provide privacy and security for buyers ordering items. Secure web server 402 sends received requests to appropriate components, such as user registration 404, shopping cart engine 406, order engine 408, catalog 410, and business-to-business setup 412 for processing. Additionally, secure web server 402 will receive results and format those results for return to the originator of the requests. In these examples, the requests are received in an HTTP format and placed in the appropriate form for use by other components in server 400. Further, secure web server 402 will reformat the responses from these components into the appropriate form for return to the requestor.

User registration 404 is used to identify and register buyers who submit purchase orders. Catalog 410 in these examples is used to provide information, such as identification of items being sold as well as quantities of these items and descriptions of the items. Shopping cart engine 406 allows a user to store or hold items identified through catalog 410 in a "shopping cart."

Order engine 408 provides order handling processes to generate purchase orders from items placed in a shopping cart for a customer. Further, order engine 408 forwards purchase orders for items to a primary server within the web commerce server system for processing.

Business-to-business setup 412 is employed to provide for the setup of catalog items, negotiating of terms and conditions for purchasing items setup in the catalog, selection of a method/protocol for buyers to connect and purchase items from the catalog, establish operational items, and setting up a site for the catalog. In these examples, a user may "meta-shop" or select items from catalog 410, which is a base, general, or public catalog. Upon a request from a user, the items placed in the shopping cart through these selections are used to generate customized catalog 414. Various terms and conditions also may be associated with customized catalog 414. Further, customized catalog 414 may also be sent to a user for use locally by the user.

The components shown in FIG. 4 are for illustrative purposes and not meant as limitations to the implementation of the present invention. Other components may be used in addition to or in place of the illustrated components for providing web commerce services.

Figure 5:
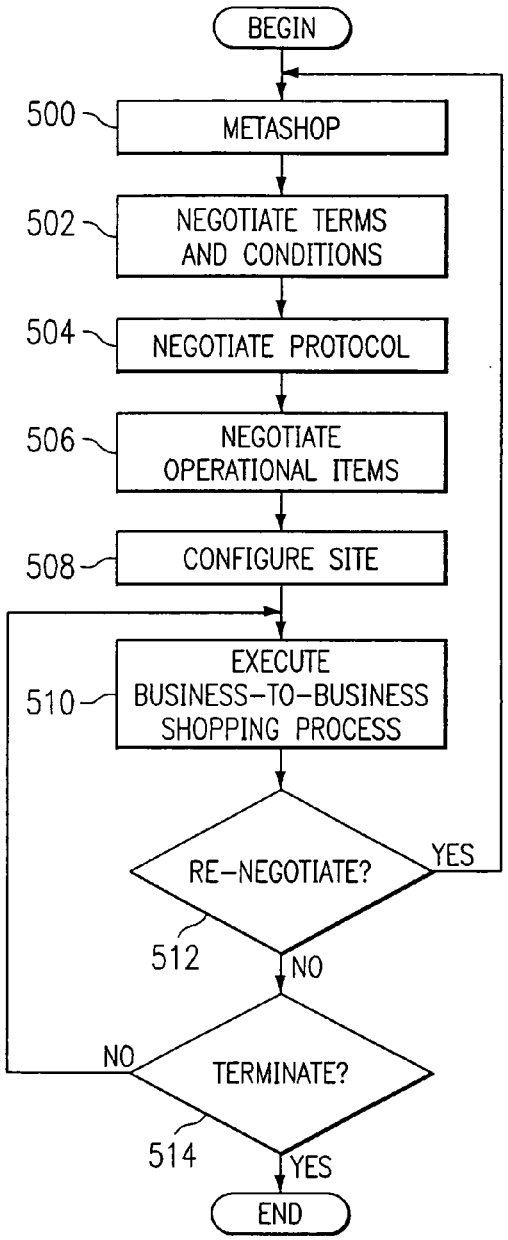
FIG. 5 is a flowchart of a process used for setting up a catalog for business-to-business transaction in accordance with a preferred embodiment of the present invention.

Turning next to FIG. 5, a flowchart of a process used for setting up a catalog for business-to-business transaction is depicted in accordance with a preferred embodiment of the present invention. The process illustrated in FIG. 5 may be implemented in business-to-business setup 412 in FIG. 4.

The process begins with meta-shopping (step 500). In setting up a catalog of items for a buying organization, the idea of a "meta-shopping cart" is used. The selling organization sets up an on-line catalog as typically found on Web sites today. A buying organization or entity "meta-shops" at the site selecting items. The items, however, are not items that are to be bought at the present time, but rather items that the entity may be interested in potentially buying at a later time. This type of shopping is referred to as "meta-" shopping. The items selected by the user are stored in the meta-shopping cart. This cart contains items that the user selects for possible future purchases by the entity represented by the user. The user can select broad classes of items for inclusion in the meta-shopping cart, for example, all laptop computers available in the general catalog. When the user is finished, a meta-buy button may be selected to initiate a function to create a private catalog. In the depicted examples, the user is prompted for information about the organization, an organization i.d., a password, and other information, which is used to set up and control access to the catalog for the entity. The catalog is then populated with the items placed in the meta-shopping cart. Default prices from the base catalog are associated with the items in the private catalog.

Next, terms and conditions are negotiated (step 502). After the catalog setup, then the user may negotiate terms and conditions for purchasing items set up in the catalog. The catalog is set up with default terms and conditions including base prices, delivery times, associated volumes, locations served, order cancellation periods, returns, and any associated penalty, payment methods and terms, and other contractual terms and conditions.

The method or protocol by which a buyer connects and orders items from the catalog at the seller's site is negotiated (step 504). In these examples, the default method is to provide for shopping directly from the seller's site from the catalog. Other methods that may be used include, for example, protocols such as Ariba's punchout, which is a remote catalog process, Open Buying on the Internet (OBI) protocol, Open Catalog Interface (OCI), or any other protocol that may be employed for facilitating transactions. Selection of the protocol typically requires specification of related items, such as universal resource locators (URLs), certificate information, and other items that may be used for establishing a connection. After this step is completed, the user completes selection of the protocol for shopping and ordering at the seller's site.

Then, operational items are negotiated (step 506). These operational items include service level agreements for buying under the terms agreed to in the steps described above. These agreements include items, such as seller's site response time, availability of items, contacts for problems, errors, non-delivery, and other related items. In these examples, the representative for the entity may agree to default operational terms, select from selectable items, or negotiate specific items. At the end of this step, each party either electronically signs the agreement or papers for the agreement are exchanged and signed.

The site is then configured (step 508). The setting up of the site in step 508 involves setting up the site according to the terms of the agreement reached in the steps described above. Next, the business-to-business shopping process is executed (step 510). After the site is set up, the entity is notified that the catalog is up and ready for receiving purchase orders. Selected users from the entity then shop and place orders from the private catalog, using the protocol thus established. At any point thereafter, a determination is made as to whether to re-negotiate (step 512). If re-negotiating will not take place, a determination is made as to whether to terminate (step 514) with the process terminating thereafter if so.

With reference again to step 512, if re-negotiating will occur, the process returns to step 500. Turning back to step 514, if the process will not terminate, the process returns to step 510.

Figure 6:
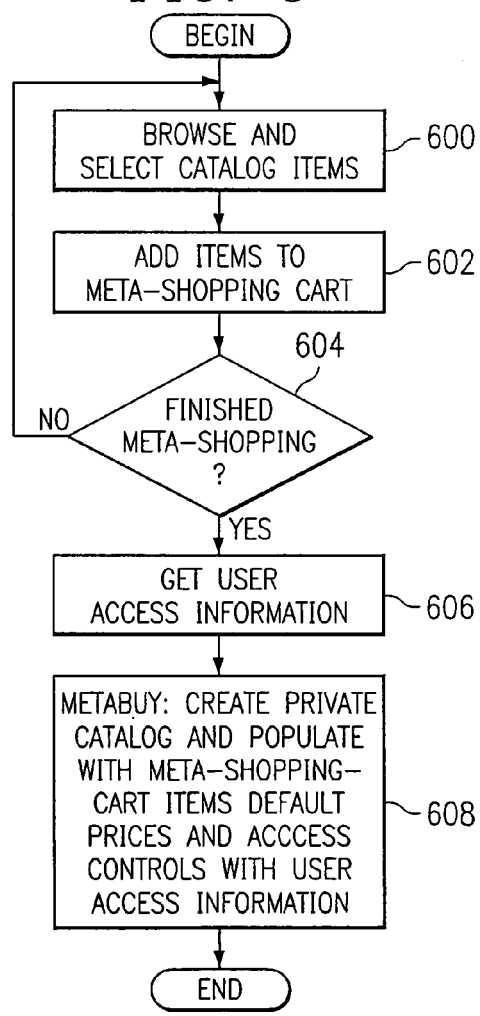
FIG. 6 is a flowchart of a process used for creating a customized catalog in accordance with a preferred embodiment of the present invention.

Turning next to FIG. 6, a flowchart of a process used for creating a customized catalog is depicted in accordance with a preferred embodiment of the present invention. The process illustrated in FIG. 6 may be implemented in business-to-business setup 412 in FIG. 4.

The process begins by browsing and selecting catalog items (step 600). These items are selected from a base or publicly available catalog. This catalog contains items that normally may be purchased from the entity providing items for purchase. Next, items are added to meta-shopping cart (step 602). A determination is made as to whether meta-shopping is finished (step 604). If meta-shopping is finished, user access information is retrieved (step 606). A private or customized catalog is created and populated with meta-shopping-cart items, prices and access controls are defaulted with user access information (step 608) with the process terminating thereafter.

With reference again to step 604, if meta-shopping is not finished, the process returns to step 600.

Figure 7:
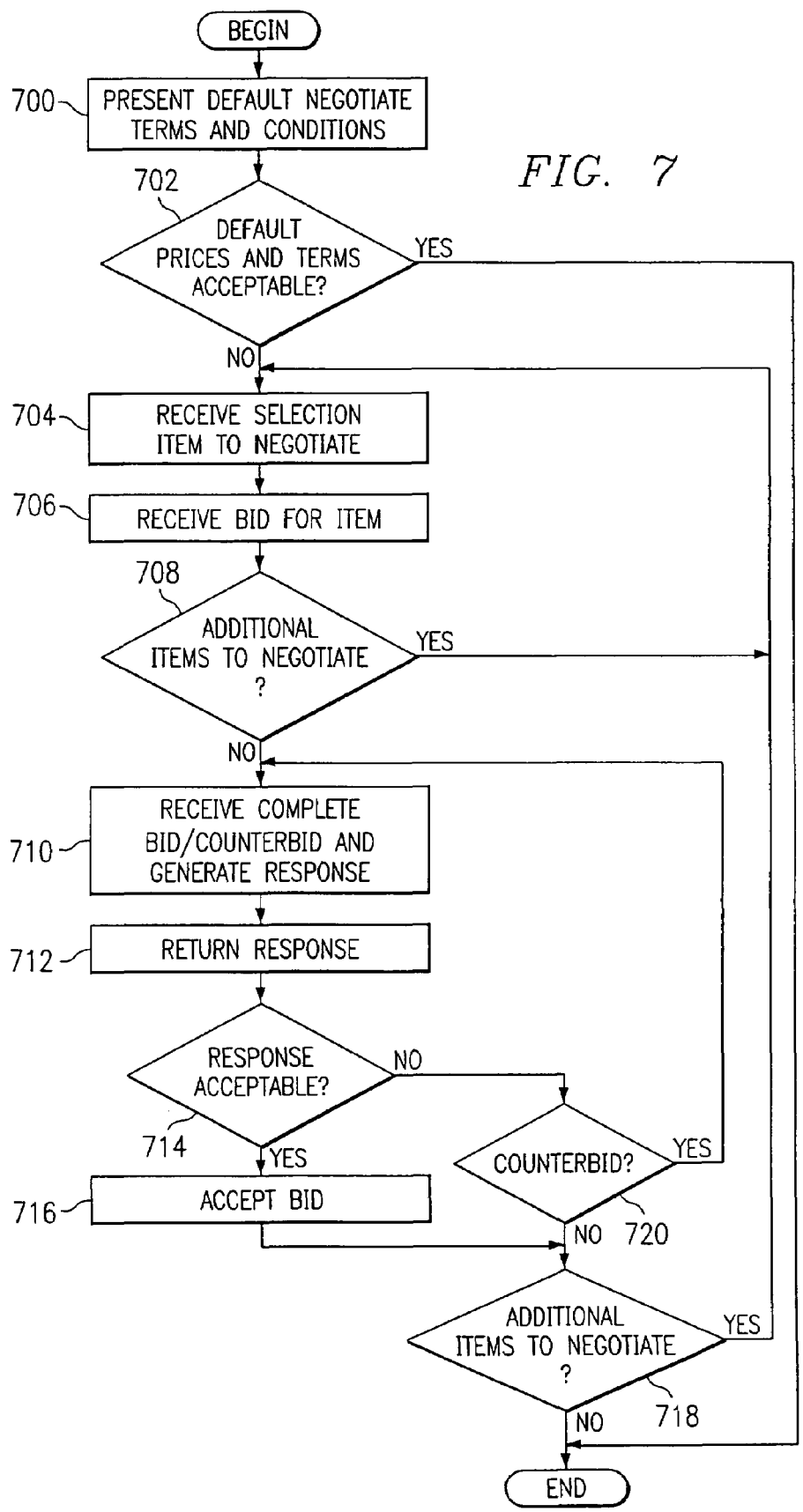
FIG. 7 is a flowchart of a process used for negotiating terms and conditions for the business-to-business relationship in accordance with a preferred embodiment of the present invention.

Turning next to FIG. 7, a flowchart of a process used for negotiating terms and conditions for the business-to-business relationship is depicted in accordance with a preferred embodiment of the present invention. The process illustrated in FIG. 7 may be implemented in business-to-business setup 412 in FIG. 4.

The process begins by presenting default negotiate terms and conditions (step 700). Next, a determination is made as to whether the default prices and terms are acceptable (step 702). If the default prices and terms are not acceptable, items are selected from the customized catalog by the user for negotiation, and these selected items to negotiate are received by the seller (step 704). Then, a bid is received from the user for the item (step 706). A determination is then made as to whether any additional items are present to negotiate (step 708). If there are not any additional items to negotiate, the bid or counterbid complete is submitted and a response is generated (step 710). This response may be generated by a program, for example, using rules for volume and price, or may be generated by a person using a workflow system, who examines the bids and generates a response. The response is then sent to the user (step 712). A determination is made as to whether the response is acceptable to the user (step 714). If the response is acceptable, the bid is accepted (step 716). Then, a determination is made as to whether there are any additional items to negotiate (step 718). If there are no additional items to negotiate, the process terminates.

With reference again to step 702, if the default prices and terms are acceptable, the process terminates. Turning back to step 708, if additional items are present to negotiate, the process returns to step 704. With reference again to step 714, if the response is not acceptable, a determination is made as to whether to counterbid (step 720). If a counterbid is made, the process returns to step 710. If a counterbid is not made, the process returns to step 716

Thus, the present invention provides an improved method, apparatus, and computer implemented instructions for setting up a customized catalog and establishing a mechanism for business-to-business transactions. In addition to the particular implementation described above, additional features and variations may be made. For example, in meta-buying items as described above, in addition to populating a catalog at the seller's site for the user, meta-shopping cart items may be assembled in a message and sent back to the user. This meta-shopping cart may be converted into an eXtensible Markup Language (XML) based format and returned to the user in a hidden field. The user may post the meta-shopping cart results to a local catalog application at the buyer's site to populate a local private catalog with these items.

Further, the user may meta-shop at multiple remote sites and create a local catalog that is comprised of selected items from different selling sites. Orders placed on items from the local catalog may then be formatted into purchase orders in an XML format and sent to corresponding selling entities.

As a further variation on the mechanism of the present invention, meta-shopping cart items may be assembled in an XML message and returned to the user. The user then posts this meta-shopping cart to a local catalog application, such as a catalog application on a workstation or personal digital assistant. The browsing and ordering from the catalog may be performed locally and possibly when disconnected from the network. When the user reconnects to the network, the order is then sent to the server using the negotiated protocol as described above.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted illustrations show the mechanism of the present invention embodied on a single server, this mechanism may be distributed through multiple data processing systems. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a first data processing system for generating a custamized catalog, the method comprising:
presenting a plurality of items to a user located at a second data processing system;
placing an item from the plurality of items in a meta shopping cart in response to a selection of the item by the user;
generating the customized catalog in response to a request indicating that the meta shopping cart is complete, the customized catalog containing items that the user has placed in the meta shopping cart for possible future purchase by an entity represented by the user;
negotiating terms for purchasing items in the generated customized catalog;
establishing a protocol for purchasing items from the customized catalog; and
placing the customized catalog on a Web site.

2. The method of claim 1 further comprising:
establishing operational items including at least one service level agreement for purchasing the items pursuant to the negotiated terms.

3. A data processing system in a first data processing system for generating a customized catalog, the data processing system comprising:
presenting means for presenting a plurality of items to a user located at a second data processing system;
placing means for placing an item from the plurality of items in a meta shopping cart in response to a selection of the item by the user;
generating means for generating the customized catalog in response to a request indicating that the meta shopping cart is complete, the customized catalog containing items that the user has placed in the meta shopping cart for possible future purchase by an entity represented by the user;

negotiating means for negotiating terms for purchasing items in the generated customized catalog;

establishing means for establishing a protocol for purchasing items from the customized catalog; and placing means for placing the customized catalog on a Web site.

4. The method of claim 3, wherein the establishing means is a first establishing means and further comprising:

second establishing means for establishing operational items including at least one service level agreement for purchasing the items pursuant to the negotiated terms.

5. A data processing system comprising:

a bus system;

a communications unit connected to the bus, wherein data is sent and received using the communications unit;

a memory connected to the bus system, wherein a set of instructions are located in the memory; and a processor unit connected to the bus system, wherein the processor unit executes the set of instructions to present a plurality of items to a user located at a second data processing system, place an item from the plurality of items in a meta shopping cart in response to a selection of the item by the user, generate the customized catalog in response to a request indicating that the meta shopping cart is complete, the customized catalog containing items that the user has placed in the meta-shopping cart for possible future purchase by the entity represented by the user negotiate terms for purchasing items in the generated customized catalog, establish a protocol for purchasing items from the customized catalog, and place the customized catalog on a Web site.

6. The data processing system of claim 5, wherein the processor unit further executes the set of instructions to establish operational items including at least one service level agreement for purchasing the items pursuant to the negotiated terms.

7. An article of manufacture comprising a computer program product in a computer readable medium in a first data processing system for generating a customized catalog, the computer program product comprising:

first instructions for presenting a plurality of items to a user located at a second data processing system;

second instructions for placing an item from the plurality of items in a meta shopping cart in response to a selection of the item by the user;

third instructions for generating the customized catalog in response to a request indicating that the meta shopping cart is complete, the customized catalog containing items that the user has placed in the set for possible future purchase by an entity represented by the user;

fourth instructions for negotiating terms for purchasing items in the generated customized catalog;

fifth instructions for establishing a protocol for purchasing items from the customized catalog; and sixth instructions for placing the customized catalog on a Web site.

8. The computer program product of claim 7 further comprising:

sixth instructions for establishing operational items including at least one service level agreement for purchasing the items pursuant to the negotiated terms.

* * * * *

UNITED STATES PATENT AND TRADEMARK OFFICE
CERTIFICATE OF CORRECTION

| | | |
|---|---|---|
| PATENT NO. | : 7,085,737 B2 | Page 1 of 1 |
| APPLICATION NO. | : 09/815374 | |
| DATED | : August 1, 2006 | |
| INVENTOR(S) | : Dan et al. | |

It is certified that error appears in the above-identified patent and that said Letters Patent is hereby corrected as shown below:

Col. 8, line 34: before "catalog" delete "custamized" and insert --customized--.

Col. 9, line 32: after "user" insert -- , --.

Signed and Sealed this

Fifth Day of December, 2006

JON W. DUDAS
*Director of the United States Patent and Trademark Office*